(12) United States Patent
Aoki

(10) Patent No.: US 8,483,263 B2
(45) Date of Patent: Jul. 9, 2013

(54) RECEIVER CIRCUIT

(75) Inventor: Yasushi Aoki, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 332 days.

(21) Appl. No.: 12/926,834

(22) Filed: Dec. 13, 2010

(65) Prior Publication Data

US 2011/0142119 A1 Jun. 16, 2011

(30) Foreign Application Priority Data

Dec. 16, 2009 (JP) ................................. 2009-285407

(51) Int. Cl.
*H04L 27/00* (2006.01)

(52) U.S. Cl.
USPC .......................................................... 375/230

(58) Field of Classification Search
USPC ................... 375/230, 232, 350; 708/322–323
See application file for complete search history.

(56) References Cited

U.S. PATENT DOCUMENTS

| | | | | |
|---|---|---|---|---|
| 6,163,516 A | * | 12/2000 | Ma ............................... | 369/59.2 |
| 2006/0176946 A1 | * | 8/2006 | Yamaguchi .................. | 375/232 |
| 2007/0064845 A1 | * | 3/2007 | Phanse et al. ................ | 375/348 |
| 2007/0121716 A1 | * | 5/2007 | Nagarajan et al. ........... | 375/229 |
| 2007/0280391 A1 | | 12/2007 | Hidaka | |
| 2008/0292026 A1 | * | 11/2008 | Preisach ....................... | 375/340 |
| 2010/0027712 A1 | | 2/2010 | Poulton | |

FOREIGN PATENT DOCUMENTS

| | | |
|---|---|---|
| JP | 63-107255 A | 5/1988 |
| JP | 2002-271427 A | 9/2002 |
| JP | 2008-5483 A | 1/2008 |
| WO | WO 2008/085943 A2 | 7/2008 |

OTHER PUBLICATIONS

Specification of MAXIM, 10.7Gbps Adaptive Receive Equalizer, MAX3805. MAXIM Intergrated Products, 2003, pp. 1-10.
Robert Payne et al. "A 6.25-Gb/s Binary Transceiver in 0.13-um CMOS for Serial Data Transmission Across High Loss Legacy Backplane Channels." IEEE Journal of Solid-State Circuits, vol. 40, No. 12, Dec. 2005, pp. 2646-2657.
Yasuo Hidaka et al. "A 4-Channel 3.1/10.3Gb/s Transceiver Macro with a Pattern-Tolerant Adaptive Equalizer." ISSCC 2007, Feb. 14, 2007, pp. 442-443.
Notice of Reason(s) for Rejection dated May 17, 2011, with English translation.

* cited by examiner

*Primary Examiner* — Khanh C Tran
(74) *Attorney, Agent, or Firm* — McGinn IP Law Group, PLLC

(57) ABSTRACT

A receiver circuit includes an equalizer circuit that adjusts reception intensity of an input signal based on an intensity adjustment value to generate a correction input signal; a first holding unit that holds a plurality of data items sampled based on a sampling clock for sampling values of the data items transmitted by the correction input signal in a receiving order; a second holding unit that holds a plurality of values of the correction input signal sampled based on a complementary sampling clock for sampling a boundary value of the data items in a receiving order; and an equalizer control circuit that judges the strength of reception intensity of the correction input signal based on a plurality of output signals of the first holding unit and a plurality of output signals of the second holding unit to update the intensity adjustment value based on the judgment result.

8 Claims, 13 Drawing Sheets

| FILTER PATTERN | Input | | | | | ISI level | EQ gain |
|---|---|---|---|---|---|---|---|
| | D0 | D1 | D2 | D3 | D4 | B3 | |
| FP0 | L | L | L | L | H | L | -1 (under) | up |
| | | | | | | H | +1 (over) | down |
| FP1 | L | L | L | H | L | L | -1 (under) | up |
| | | | | | | H | +1 (over) | down |
| FP2 | H | H | H | L | H | L | +1 (over) | down |
| | | | | | | H | -1 (under) | up |
| FP3 | H | H | H | H | L | L | +1 (over) | down |
| | | | | | | H | -1 (under) | up |

Fig. 13   PRIOR ART

RECEIVER CIRCUIT

INCORPORATION BY REFERENCE

This application is based upon and claims the benefit of priority from Japanese patent application No. 2009-285407, filed on Dec. 16, 2009, the disclosure of which is incorporated herein in its entirety by reference.

BACKGROUND

1. Field of the Invention

The present invention relates to a receiver circuit, and more particularly, to a receiver circuit including an equalizer circuit that performs intensity adjustment of a reception signal.

2. Description of Related Art

In recent years, a speed of communication that is performed between semiconductor devices has been increasing. In particular, there is a significant influence on signal intensities by a transmission path of signals when communication is performed by signals having high frequencies. Accordingly, a receiver circuit that receives such signals receives signals by an equalizer circuit that adjusts signal intensities, so as to transmit signals whose signal intensities are adjusted to a circuit located at the subsequent stage.

One example of a receiver circuit including such an equalizer circuit is disclosed in MAXIM, 10.7 Gbps Adaptive Receive Equalizer MAX3805 specification, Robert Payne et al., "A 6.25-Gb/s Binary Transceiver in 0.13-μm CMOS for Serial Data Transmission Across High Loss Legacy Backplane Channels" IEEE JOURNAL OF SOLID-STATE CIRCUITS, VOL. 40, No. 12, DECEMBER 2005 (Robert Payne et al.), and Yasuo Hidaka et al., "A 4-Channel 3.1/10.3 Gb/s Transceiver Macro with a Pattern-Tolerant Adaptive Equalizer", ISSCC 2007, Feb. 14, 2007 (Yasuo Hidaka et al.). MAXIM, 10.7 Gbps Adaptive Receive Equalizer MAX3805 specification discloses an adaptive equalizer circuit that detects signal intensities by an analog circuit. However, since the adaptive equalizer circuit disclosed in MAXIM, 10.7 Gbps Adaptive Receive Equalizer MAX3805 specification detects signal intensities by comparing signal intensities in an analog circuit, signals need to be smoothed for a long period in order to improve comparison accuracy. A capacitor having large capacity is required to smooth signals for a long period, which may increase the circuit size. Further, it takes long time to perform signal comparison processing, which requires time to adjust equalizer intensity. Further, Robert Payne et al. discloses a receiver circuit that adjusts reception intensity based on a value of one reception data and a boundary value between data. However, in the receiver circuit disclosed in Robert Payne et al., only one reception data is considered. Thus, the reception intensity may be falsely judged. For example, in an input signal having a pattern in which 0 and 1 are repeated, there is no isolated pulse and the pulse width is kept constant. According to Robert Payne et al., the intensity of the equalizer circuit may be falsely detected, which may cause false adjustment of the reception intensity.

Yasuo Hidaka et al. discloses a receiver circuit that is capable of preventing false judgment of reception intensity. FIG. 11 shows a block diagram of a receiver circuit 100 disclosed in Yasuo Hidaka et al. As shown in FIG. 11, the receiver circuit 100 adjusts reception intensities of reception signals RXIP and RXIN in an equalizer. A signal output from the equalizer is output to a circuit located at the subsequent stage through a data reception sequence (Data). Further, the receiver circuit 100 detects the boundary value of the data items transmitted through the data reception sequence by a boundary value detection sequence (Boundary). The receiver circuit 100 then updates the gain code by an equalizer gain control circuit based on the value of the data and the boundary value of the data items, so as to adjust the gain of the equalizer.

Now, a gain control method in an equalizer gain control circuit of the receiver circuit 100 will be described. FIG. 12 shows a diagram showing a gain control flow in the equalizer gain control circuit. As shown in FIG. 12, the equalizer gain control circuit first selects a filter pattern FPi at random upon start of processing (step S1). The filter pattern FPi is prepared in advance, examples of which being shown in the table in FIG. 13. FIG. 13 shows four filter patterns FP0 to FP3. The equalizer gain control circuit refers to the values of the top data D0 to the last data D4 of the input data (reception pattern), and compares the selected filter pattern FPi with the reception data that is referred to (step S2). When the reception pattern matches the selected filter pattern FPi (YES in step S3), the equalizer gain is updated (step S4). This update process is performed based on an ISI level calculated based on the boundary value B3 between the reception data D3 and D4, and the value of the reception data D2. More specifically, when the boundary value B3 is in the low level (L) when the reception data D2 is in the low level (L), the ISI level indicates "under" which means the reception intensity is low, and the equalizer gain control circuit increases the equalizer gain. Further, when the boundary value B3 is in the high level (H) when the reception data D2 is in the low level (L), the ISI level indicates "over" which means the reception intensity is high, and the equalizer gain control circuit decreases the equalizer gain. Further, when the boundary value B3 is in the Low level (L) when the reception data D2 is in the high level (H), the ISI level indicates "over" which means the reception intensity is high, and the equalizer gain control circuit decreases the equalizer gain. Further, when the boundary value B3 is in the high level (H) when the reception data D2 is in the high level (H), the ISI level indicates "under" which means the reception intensity is low, and the equalizer gain control circuit increases the equalizer gain.

Although the receiver circuit 100 adjusts the equalizer gain while performing the reception operation as described above, the adjustment processing is executed irregularly when the filter pattern FPi randomly selected matches the reception data D0 to D4. FIG. 14 shows a timing chart showing a timing at which the adjustment processing is executed in the receiver circuit 100. Shown in FIG. 14 is an example in which the updating of the equalizer gain is performed at a timing at which samples 0 to 5 received at timings Φ0 to Φ5 match the filter pattern FPi that is selected at this time and the samples are received.

SUMMARY

However, the equalizer gain is not updated in the receiver circuit 100 unless the reception data that matches the filter pattern randomly selected is input. In summary, the equalizer gain is not updated in the receiver circuit 100 unless the filter pattern that matches the reception pattern is selected even when the reception data that matches the predetermined filter pattern is input. The problem is that it takes time to update the equalizer gain in the receiver circuit 100.

A first exemplary aspect of an embodiment of the present invention is a receiver circuit including: an equalizer circuit that adjusts reception intensity of an input signal based on an intensity adjustment value to generate a correction input signal; a first holding unit that holds a plurality of data items sampled based on a sampling clock for sampling values of the data items transmitted by the correction input signal in a receiving order; a second holding unit that holds a plurality of values of the correction input signal sampled based on a complementary sampling clock for sampling a boundary value of the data items in a receiving order; and an equalizer control circuit that judges the strength of reception intensity of the correction input signal based on a plurality of output signals of the first holding unit and a plurality of output signals of the second holding unit to update the intensity adjustment value based on the judgment result, in which the equalizer control circuit judges the strength of the reception intensity based on the plurality of values held in the second holding unit when first data that is held at the earliest timing by the first holding unit and second data held subsequent to the first data have the same polarity.

The receiver circuit according to the present invention judges the reception intensity when the first data and the second data of the input signal have the same polarity, and updates the reception intensity value based on the judgment result. Accordingly, updating of the reception intensity value is executed as needed, and updating of the reception intensity value can be executed in a short time.

The receiver circuit according to the present invention enables to perform the intensity adjustment of the equalizer circuit in a short time and with high accuracy.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 13 is a table showing filter patterns in the receiver circuit disclosed in Yasuo Hidaka et al.

DETAILED DESCRIPTION OF THE EXEMPLARY EMBODIMENTS

First Exemplary Embodiment

Figure 1:
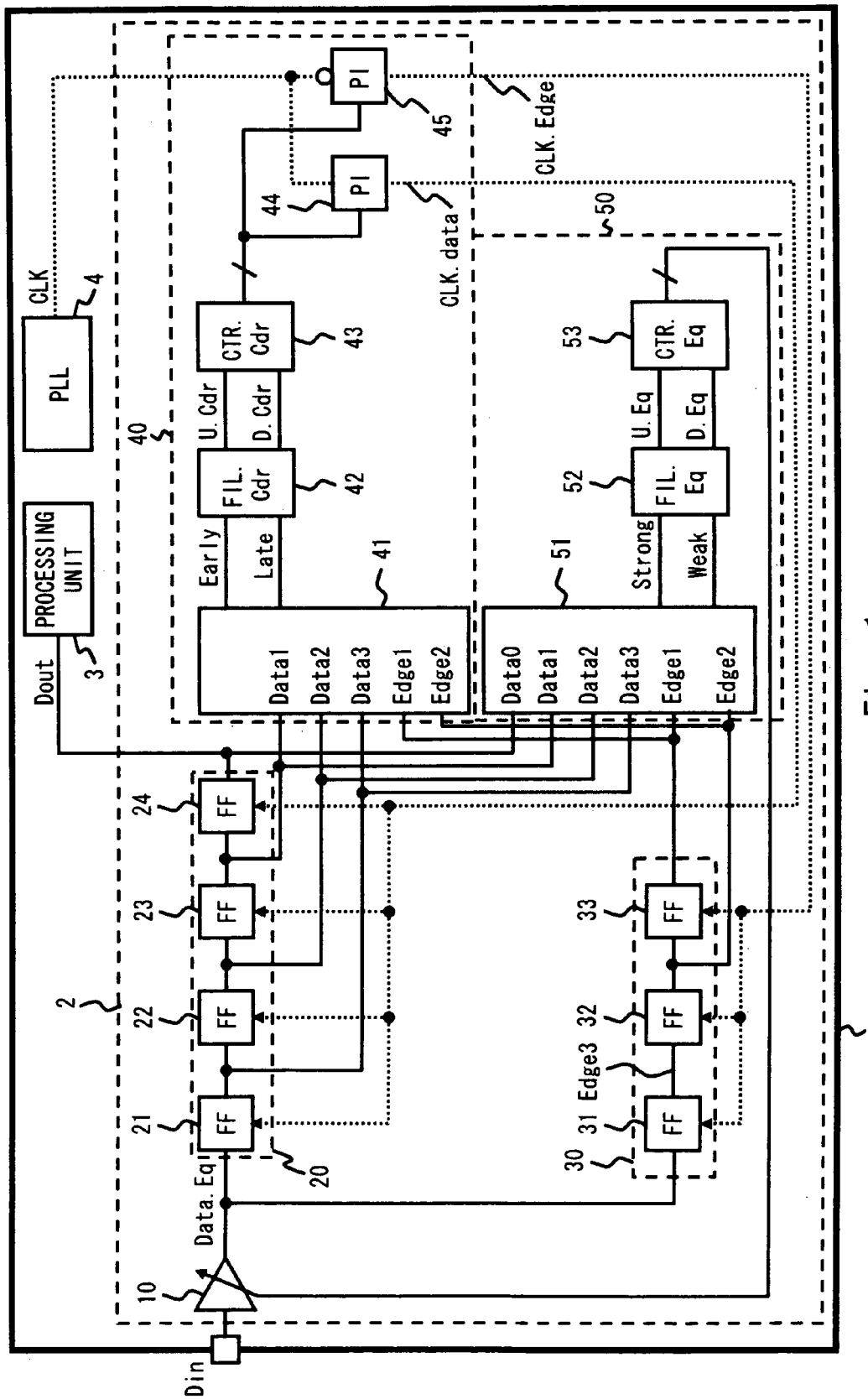
FIG. 1 is a block diagram of a semiconductor device according to a first exemplary embodiment of the present invention.

Hereinafter, a first exemplary embodiment of the present invention will be described with reference to the drawings. The present invention relates to a receiver circuit that receives data transmitted by high-frequency signals. This receiver circuit is mounted as one function of a semiconductor device. FIG. 1 is a block diagram of a semiconductor device 1 including the receiver circuit according to the present invention. The semiconductor device 1 shown in FIG. 1 also includes a transmission circuit (not shown) in addition to the receiver circuit.

The semiconductor device 1 is, for example, a data transmission/reception circuit such as a USB (Universal Serial Bus) 3.0. As shown in FIG. 1, the semiconductor device 1 includes a receiver circuit 2, a processing unit 3, and a PLL (Phase Locked Loop) 4. The semiconductor device 1 includes an input terminal connected to a USB terminal provided in a device on which the semiconductor device is mounted, and receives an input signal Din through the input terminal. The receiver circuit 2 receives the input signal Din, samples the input signal Din, and outputs a data signal Dout. The receiver circuit 2 will be described later in detail. The processing unit 3 executes information processing based on the data signal Dout. The PLL4 generates a clock signal CLK based on a reference clock signal (not shown). The clock signal is used as an operational clock of the receiver circuit 2.

The receiver circuit 2 includes an equalizer circuit 10, a first holding unit 20, a second holding unit 30, a clock phase control circuit 40, and an equalizer control circuit 50.

The equalizer circuit 10 adjusts reception intensity of the input signal based on an intensity adjustment value (output value of the equalizer control circuit 50) to generate a correction input signal (Data.Eq in the drawing). More specifically, the equalizer circuit 10 does not amplify the amplitude of a signal having a frequency lower than a frequency band which is to be intensity-adjusted, but amplifies the amplitude of a signal having a frequency within the frequency band which is to be intensity-adjusted. In other words, when the input signal is a rectangular wave, in the correction input signal generated by the equalizer circuit 10, the amplitude of the rising edge or falling edge of the rectangular wave having high frequency component is emphasized, and the amplitude is maintained for a flat part in the rectangular wave. Here, an amplified amount when the equalizer circuit 10 amplifies the amplitude of the signal within the frequency band which is to be intensity-adjusted is referred to as a boosted amount. The equalizer circuit 10 varies this boosted amount based on the intensity adjustment value.

The first holding unit 20 receives a sampling clock (CLK. data in the drawing) that samples the value of the data transmitted by the correction input signal. The first holding unit 20 then holds a plurality of data items that are sampled based on the sampling clock in the receiving order. More specifically, the first holding unit 20 includes flip-flops 21 to 24. The first holding unit 20 constitutes a shift register by flip-flops 21 to 24. More specifically, the first holding unit 20 holds the value of the data received at the latest timing in the flip-flop 21 arranged at the top, and holds the value of the data received at the earliest timing in the flip-flop 24 arranged at the last stage. In the following description, the reception data is referred to as first data Data0 to fourth data Data3 in the receiving order.

The second holding unit 30 receives a complementary sampling clock (CLK.Edge in the drawing) that samples a boundary value of data transmitted by the correction input signal. The second holding unit 30 then holds a plurality of values of the correction input signals sampled based on the complementary sampling clock in the receiving order. More specifically, the second holding unit 30 includes flip-flops 31 to 33. Then, the second holding unit 30 constitutes a shift register by the flip-flops 31 to 33. More specifically, the second holding unit 30 holds in the flip-flop 31 that is arranged at the top a boundary value (e.g., third boundary data) between the data input to the flip-flop 21 and the data (fourth data) held in the flip-flop 21, holds in the flip-flop 32 a boundary value (e.g., second boundary data Edge2) between the fourth data and the third data, and holds in the flip-flop 33 a boundary value (e.g., first boundary data Edge1) between the third data and the second data.

The clock phase control circuit 40 adjusts phases of the sampling clock and the complementary sampling clock based on a plurality of output signals output from the first holding unit 20 and a plurality of output signals output from the second holding unit 30. More specifically, the clock phase control circuit 40 delays the phases of the sampling clock and the complementary sampling clock when the second data Data1 and the first boundary data Edge1 are different from each other and the third data Data2 and the second boundary data Edge2 are different from each other, and advances the phases of the sampling clock and the complementary sampling clock when the third data Data2 and the first boundary data Edge1 are different from each other and the fourth data Data3 and the second boundary data Edge2 are different from each other.

The clock phase control circuit 40 includes a phase judgment circuit 41, a phase judgment result filter circuit 42, a phase adjustment circuit 43, and phase interpolation circuits 44 and 45. The phase judgment circuit 41 judges suitability of the phases of the sampling clock and the complementary sampling clock based on the second data Data1, the third data Data2, the fourth data Data3, the first boundary data Edge1, and the second boundary data Edge2.

Figure 2:
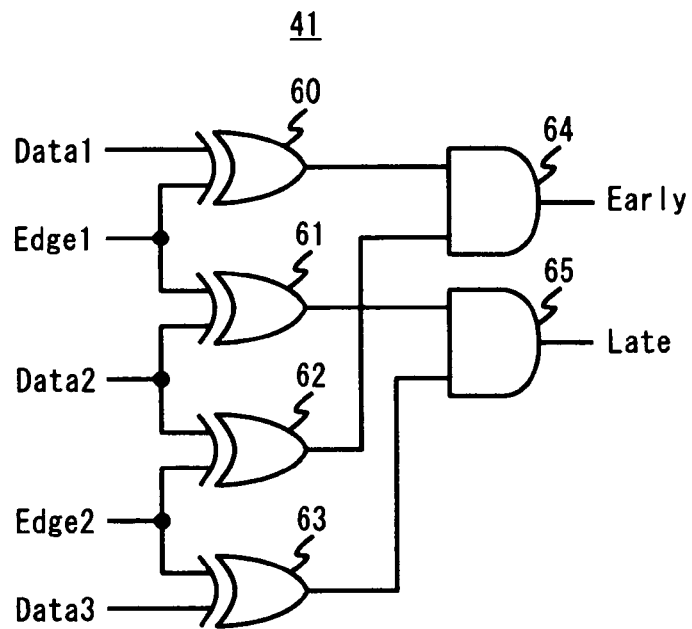
FIG. 2 is a block diagram of an equalizer control circuit according to the first exemplary embodiment of the present invention.

Now, the phase judgment circuit 41 will be described in detail. FIG. 2 shows a circuit diagram of the phase judgment circuit 41. As shown in FIG. 2, the phase judgment circuit 41 includes EXOR circuits 60 to 63, and AND circuits 64 and 65. The EXOR circuits 60 to 63 output the high-level signal when two inputs are different, and output the low-level signal when two inputs are the same. The And circuits 64 and 65 output the high-level signal only when two inputs are the same. The EXOR circuit 60 receives the second data Data1 and the first boundary data Edge1. The EXOR circuit 61 receives the first boundary data Edge1 and the third data Data2. The EXOR circuit 62 receives the third data Data2 and the second boundary data Edge2. The EXOR circuit 63 receives the second boundary data Edge2 and the fourth data Data3. The And circuit 64 receives output signals of the EXOR circuit 60 and the EXOR circuit 62. The phase judgment circuit 41 sets the output signal of the AND circuit 64 (Early flag) to the high level upon judgment that the phase advances. The And circuit 65 receives output signals of the EXOR circuit 61 and the EXOR circuit 63. The phase judgment circuit 41 sets the output signal of the AND circuit 65 (Late flag) to the high level upon judgment that the phase delays.

The phase judgment circuit 41 judges that the phases of the sampling clock and the complementary sampling clock are advancing when the second data Data1 and the first boundary data Edge1 are different from each other and the third data Data2 and the second boundary data Edge2 are different from each other, and judges that the phases of the sampling clock and the complementary sampling clock are delaying when the third data Data2 and the first boundary data Edge1 are different from each other and the fourth data Data3 and the second boundary data Edge2 are different from each other.

The phase judgment result filter circuit 42 holds an accumulated value obtained by accumulating the judgment results of the phase in the phase judgment circuit 41, and outputs a phase delay instruction signal D.Cdr or a phase advance instruction signal U.Cdr that specifies the phases of the complementary sampling clock and the sampling clock according to the accumulated value reaching the predetermined upper-limit value or the lower-limit value. More specifically, the phase judgment result filter circuit 42 decreases the accumulated value by one upon judgment that the phase of the phase judgment circuit 41 is advancing (when Early flag indicates the high level). On the other hand, the phase judgment result filter circuit 42 increases the accumulated value by one upon judgment that the phase of the phase judgment circuit 41 is delaying (when Early flag indicates the high level). The phase judgment result filter circuit 42 outputs the phase delay instruction signal D.Cdr when the accumulated value reaches the upper-limit value (e.g., 10), and outputs the phase advance instruction signal U.Cdr when the accumulated value reaches the lower-limit value (e.g., −10). Further, the phase judgment result filter circuit 42 resets the accumulated value to the initial value after the accumulated value reaches the upper-limit value or the lower-limit value.

The phase adjustment circuit 43 controls the phases of the sampling clock and the complementary sampling clock according to the phase delay instruction signal D.Cdr or the phase advance instruction signal U.Cdr. More specifically, the clock phase control circuit 40 includes phase interpolation circuits 44 and 45 that interpolate the phase of the clock signal CLK and generate a plurality of clock signals having different phases. The phase adjustment circuit 43 changes a control value that specifies the clock signal selected by the phase interpolation circuits 44 and 45. The phase interpolation circuit 44 generates the sampling clock. On the other hand, the phase interpolation circuit 45 generates the complementary sampling clock having the complementary relation with the clock signal generated by the phase interpolation circuit 44.

The equalizer control circuit 50 judges that the reception intensity is low and updates the reception intensity value so as to make the reception intensity higher when the first boundary data Edge1 and the second boundary data Edge 2 have the different polarity from the third data Data2 in the state in which the first data Data0 and the second data Data1 have the same polarity. On the other hand, when the first boundary data Edge1 and the second boundary data Edge2 have the same polarity as the third data Data2, the equalizer control circuit 50 judges that the reception intensity is high, and updates the reception intensity value so as to make the reception intensity lower.

The equalizer control circuit 50 includes an intensity judgment circuit 51, an intensity judgment result filter circuit 52, and an intensity updating circuit 53. The intensity judgment circuit 51 judges the strength of the reception intensity of the correction input signal based on the first data Data0, the second data Data1, the third data Data2, the fourth data Data3, the first boundary data Edge1, and the second boundary data Edge2.

Figure 3:
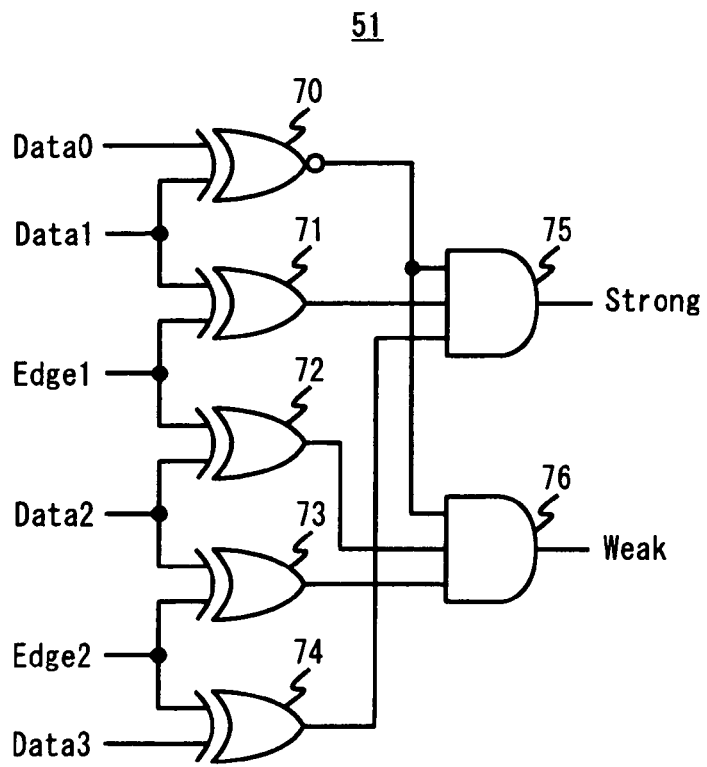
FIG. 3 is a block diagram of a clock phase control circuit according to the first exemplary embodiment of the present invention.

Now, the intensity judgment circuit 51 will be described in detail. FIG. 3 shows a circuit diagram of the intensity judgment circuit 51. As shown in FIG. 3, the intensity judgment circuit 51 includes an EXNOR circuit 70, EXOR circuits 71 to 74, and And circuits 75 and 76. The EXNOR circuit 70 outputs the low-level signal when two inputs are different from each other, and outputs the high-level signal when two inputs are the same. The EXOR circuits 71 to 74 each output the high-level signal when two inputs are different from each other, and output the low-level signal when two inputs are the same. The And circuits 75 and 76 each output the high-level signal only when two inputs are the same. The EXNOR circuit 70 receives the first data Data0 and the second data Data1. The EXOR circuit 71 receives the second data Data1 and the first boundary data Edge1. The EXOR circuit 72 receives the first boundary data Edge1 and the third data Data2. The EXOR circuit 73 receives the third data Data2 and the second boundary data Edge2. The EXOR circuit 74 receives the second boundary data Edge2 and the fourth data Data3. The And circuit 75 receives the output signals of the EXNOR circuit 70, the EXOR circuit 71, and the EXOR circuit 74. The intensity judgment circuit 51 sets the output signal of the And circuit 75 (Strong flag) to the high level upon judgment that the intensity of the correction input signal is high. Further, the And circuit 76 receives the output signals of the EXNOR circuit 70, the EXOR circuit 72, and the EXOR circuit 73. Then, the intensity judgment circuit 51 sets the output signal of the And circuit 76 (Weak flag) to the high level upon judgment that the intensity of the correction input signal is low.

In summary, the intensity judgment circuit 51 judges that the reception intensity is low when the first boundary data Edge1 and the second boundary data Edge 2 have the different polarity from the third data Data2, and judges that the reception intensity is high when the first boundary data Edge1 and the second boundary data Edge2 have the same polarity to the third data Data2 in the state in which the first data Data0 and the second data Data1 have the same polarity.

The intensity judgment result filter circuit 52 holds the accumulated value obtained by accumulating the intensity judgment results of the correction input signals in the intensity judgment circuit 51, and outputs an intensity reinforcement signal U.Eq or an intensity suppression signal D.Eq that specifies the updating direction of the intensity adjustment value according to the accumulated value reaching the predetermined upper-limit value or lower-limit value. More specifically, when the intensity judgment circuit 51 judges that the reception intensity of the correction input signal is high (when the Strong flag indicates the high level), the intensity judgment result filter circuit 52 decreases the accumulated value by one. On the other hand, when the intensity judgment circuit 51 judges that the intensity of the correction input signal is low (when the Weak flag indicates the high level), the intensity judgment result filter circuit 52 increases the accumulated value by one. Then, the intensity judgment result filter circuit 52 outputs the intensity reinforcement signal U.Eq when the accumulated value reaches the upper-limit value (e.g., 10), and outputs the intensity suppression signal D.Eq when the accumulated value reaches the lower-limit value (e.g., −10). Further, the intensity judgment result filter circuit 52 resets the accumulated value to the initial value after the accumulated value reaches the upper-limit value or the lower-limit value.

The intensity updating circuit 53 updates the intensity adjustment value according to the intensity reinforcement signal U.Eq or the intensity suppression signal D.Eq. More specifically, the intensity updating circuit 53 updates the intensity adjustment value so as to make the reception intensity higher when the intensity reinforcement signal U.Eq is received (e.g., make the intensity adjustment value larger), and updates the intensity adjustment value so as to make the reception intensity lower when the intensity suppression signal D.Eq is received (e.g., make the intensity adjustment value smaller).

Figure 4:
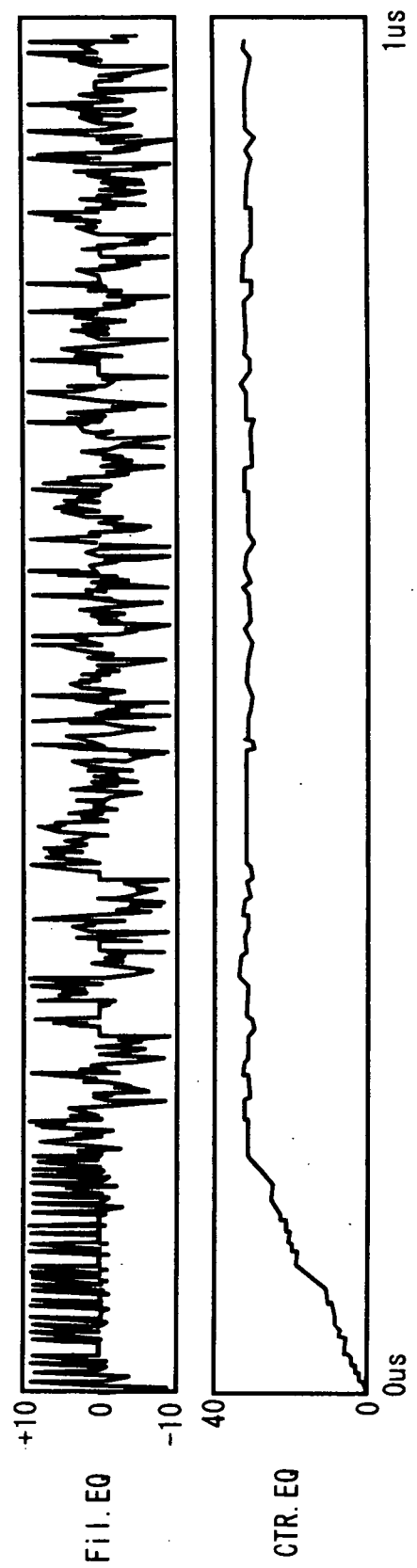
FIG. 4 is a timing chart showing an operation of a receiver circuit according to the first exemplary embodiment of the present invention.

Now, FIG. 4 shows a graph showing the updating state of the accumulated value and the intensity adjustment value in the equalizer control circuit 50, so as to describe an operation of the equalizer control circuit 50. In FIG. 4, the upper graph shows time transition of the accumulated value, and the lower graph shows time transition of the intensity adjustment value. As shown in FIG. 4, the accumulated value held in the intensity judgment result filter circuit 52 has an upper-limit value (e.g., 10) to a lower-limit value (e.g., −10), with the initial value of 0. Further, the intensity adjustment value is updated every time the accumulated value reaches the upper-limit value or the lower-limit value. The intensity adjustment value converge a constant value. As stated above, the intensity judgment result filter circuit 52 prevents the judgment result in the intensity judgment circuit 51 from being directly reflected in the intensity adjustment value, thereby reducing the influences of fluctuations of the boundary data due to jitter or metastable state in the first and second boundary data, for example, so as to reduce false judgment of the intensity judgment.

Figure 5:
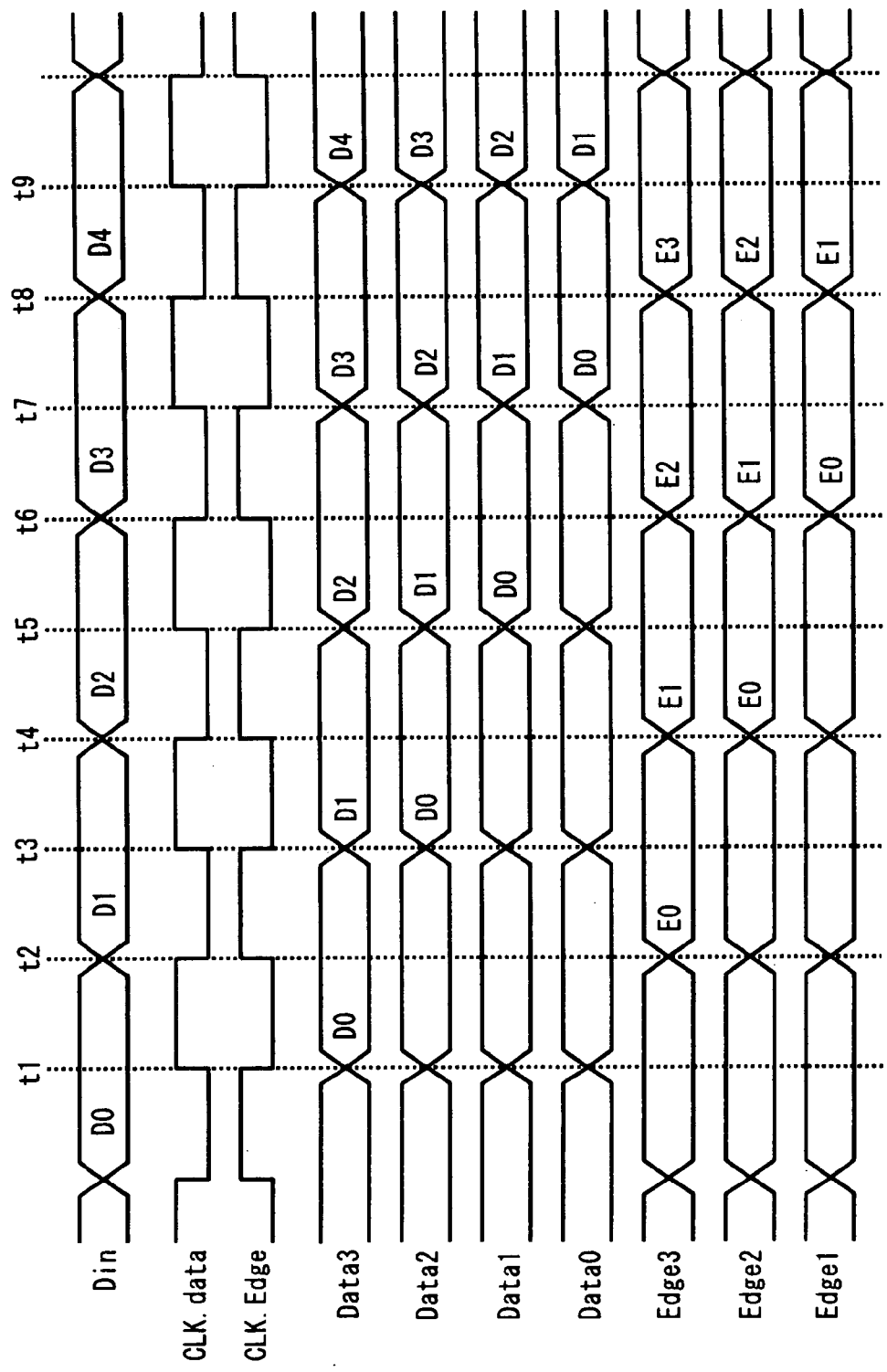
FIG. 5 is a diagram showing waveforms in a case in which reception intensity is judged to be high in the receiver circuit according to the first exemplary embodiment of the present invention.

Next, an operation of the receiver circuit 2 according to the first exemplary embodiment will be described. First, FIG. 5 shows a timing chart showing the operation of the receiver circuit 2. As shown in FIG. 5, the input signal Din is input to the receiver circuit 2, and the data D0 to D4 are sequentially received.

First, at timing t1, the first holding unit 20 receives the data D0 as the fourth data Data3 in accordance with the rising of the sampling clock CLK.data. Next, the second holding unit 30 receives the boundary value E0 which is between the data D0 and the data D1 as the third boundary data Edge3 in accordance with the rising of the complementary sampling clock CLK.Edge. Then, the first holding unit 20 receives the new data while transferring data held previously to a subsequent flip-flop for every rising edge of the sampling clock CLK.data (timing t3, t5, t7, t9). Further, the second holding unit 30 receives the new boundary value while transferring the boundary value held previously to a subsequent flip-flop for every rising edge of the complementary sampling clock CLK.Edge (timing t4, t6, t8).

Figure 6:
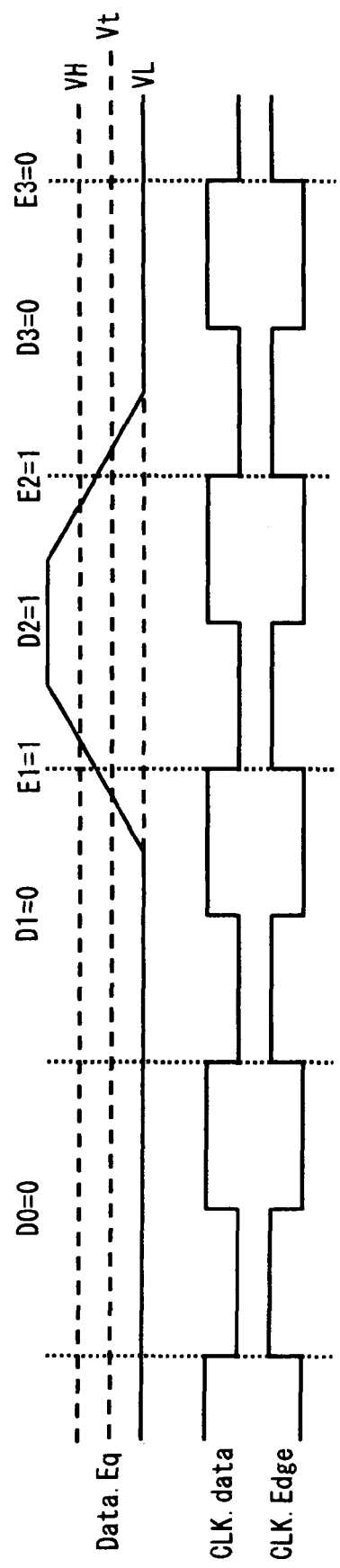
FIG. 6 is a diagram showing waveforms in a case in which the reception intensity is judged to be low in the receiver circuit according to the first exemplary embodiment of the present invention.

Now, the intensity judgment processing of the receiver circuit 2 will be described further in detail. In the following description, the intensity judgment processing of the receiver circuit 2 will be described taking intensity judgment processing at a time at which the processing of taking the boundary value at timing t8 is completed as an example. FIG. 6 shows an example of waveforms in a case in which the reception intensity is judged to be high. In the example shown in FIG. 6, the optimal upper-limit value of the correction input signal Data.Eq is denoted by VH, the optimal lower-limit value is denoted by VL, and the judgment threshold value of the High level and the Low level is denoted by Vt.

In the example shown in FIG. 6, data D0 to D3 have the values of 0, 0, 1, 0, respectively. Thus, the first data Data0 is 0, the second data Data1 is 0, the third data Data2 is 1, and the fourth data Data3 is 0. Further, in the example shown in FIG.

6, the reception intensity is high, which makes the rising of the correction input signal Data.Eq steep and large amplitude. Thus, the boundary value E1 between the second data Data1 and the third data Data2 is 1, and the boundary value E2 between the third data Data2 and the fourth data Data3 is 1. Hence, the first boundary data Edge1 is 1, and the second boundary data Edge2 is 1.

In the state as shown in FIG. 6, in the intensity judgment circuit 51, the output of the EXNOR circuit 70 is in the high level, and the output signals of the EXOR circuits 71 and 74 are in the high level. Thus, the intensity judgment circuit 51 judges that the reception intensity of the correction input signal is high, and sets the Strong flag to the high level. On the other hand, the output signals of the EXOR circuits 72 and 73 are set to the low level. Thus, the Weak flag of the intensity judgment circuit 51 is set to the low level. The intensity judgment result filter circuit 52 then increases the accumulated value by one according to the state of the Strong flag. Further, when the accumulated value reaches the upper-limit value in accordance with the change of the Strong flag, the intensity judgment result filter circuit 52 outputs the intensity reinforcement signal U.Eq. The intensity updating circuit 53 then updates the intensity adjustment value so as to make the reception intensity higher according to the intensity reinforcement signal U.Eq.

Figure 7:
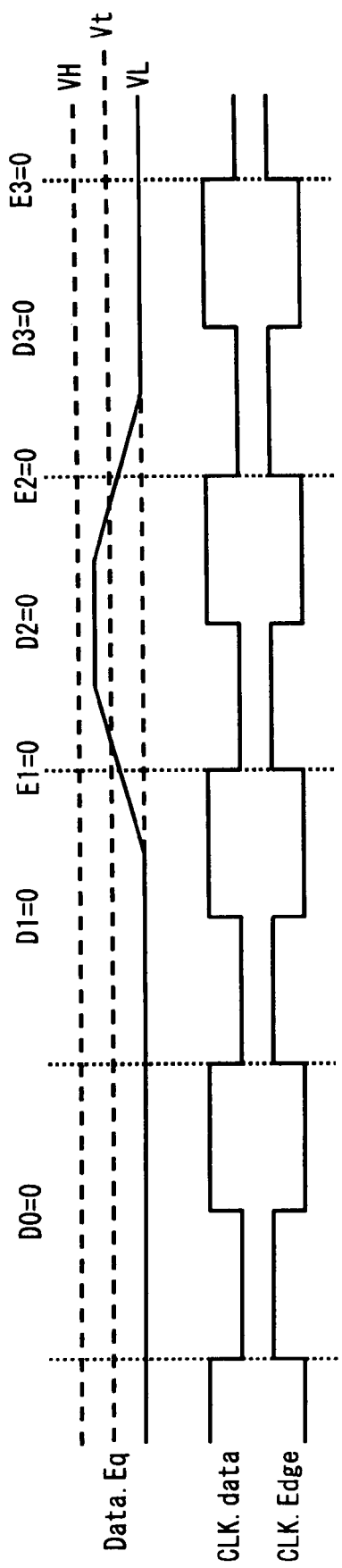
FIG. 7 is a diagram showing waveforms in a case in which the reception intensity is high but no intensity judgment is performed in the receiver circuit according to the first exemplary embodiment of the present invention.

Next, FIG. 7 shows an example of waveforms in a case in which the reception intensity is judged to be low. In the example shown in FIG. 7, the optimal upper-limit value of the correction input signal Data.Eq is denoted by VH, the optimal lower-limit value is denoted by VL, and the judgment threshold value of the High level and Low level is denoted by Vt.

In the example shown in FIG. 7, the data D0 to D3 have the values of 0, 0, 1, 0, respectively. Thus, the first data Data0 is 0, the second data Data1 is 0, the third data Data2 is 1, and the fourth data Data3 is 0. Further, in the example shown in FIG. 7, the reception intensity is low, which makes the rising of the correction input signal Data.Eq gradual and small amplitude. Thus, the boundary value E1 of the second data Data1 and the third data Data2 is 0, and the boundary value E2 of the third data Data2 and the fourth data Data3 is 0. Thus, the first boundary data Edge1 is 0, and the second boundary data Edge2 is 0.

In the state as shown in FIG. 7, in the intensity judgment circuit 51, the output of the EXNOR circuit 70 is in the high level, and the output signals of the EXOR circuits 72 and 73 are in the high level. Thus, the intensity judgment circuit 51 judges that the reception intensity of the correction input signal is low, and sets the Weak flag to the high level. On the other hand, the output signals of the EXOR circuits 71 and 74 are set to the low level. Thus, the Strong flag of the intensity judgment circuit 51 is set to the low level. Then, the intensity judgment result filter circuit 52 decreases the accumulated value by one according to the state of the Weak flag. Further, when the accumulated value reaches the lower-limit value according to the change of the Weak flag, the intensity judgment result filter circuit 52 outputs the intensity suppression signal D.Eq. Then, the intensity updating circuit 53 updates the intensity adjustment value so as to make the reception intensity lower according to the intensity suppression signal D.Eq.

Figure 8:
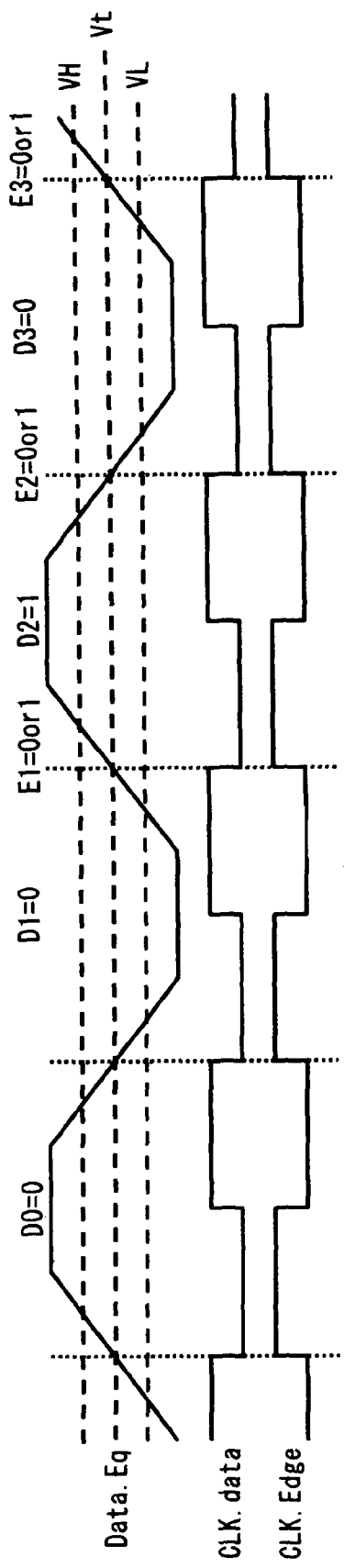
FIG. 8 is a diagram showing waveforms in a case in which the reception intensity is low but no intensity judgment is performed in the receiver circuit according to the first exemplary embodiment of the present invention.

Next, FIG. 8 shows an example of waveforms in a case in which the reception intensity is high but no intensity judgment is performed. In the example shown in FIG. 8, the optimal upper-limit value of the correction input signal Data.Eq is denoted by VH, the optimal lower-limit value is denoted by VL, and the judgment threshold value of the High level and the low level is denoted by Vt.

In the example shown in FIG. 8, the data D0 to D3 have the values of 1, 0, 1, 0, respectively. Thus, the first data Data0 is 1, the second data Data1 is 0, the third data Data2 is 1, and the fourth data Data3 is 0. Further, in the example shown in FIG. 8, the reception intensity is high, which makes both of the rising and falling of the correction input signal Data.Eq steep and large amplitude. Hence, since the boundary values E1 and E2 are each substantially a voltage in the midpoint of the ideal amplitude, the boundary value E1 between the second data Data1 and the third data Data2 is 0 or 1, and the boundary value E2 of the third data Data2 and the fourth data Data3 is 0 or 1. Accordingly, the first boundary data Edge1 is 0 or 1, and the second boundary data Edge2 is 0 or 1.

In the state as shown in FIG. 8, the output of the EXNOR circuit 70 of the intensity judgment circuit 51 is set to the low level. Thus, the Strong flag and the Weak flag are set to the low level regardless of the values of the output signals of the EXOR circuits 71 to 74. Hence, the intensity judgment result filter circuit 52 and the intensity updating circuit 53 maintain the previous state.

Figure 9:
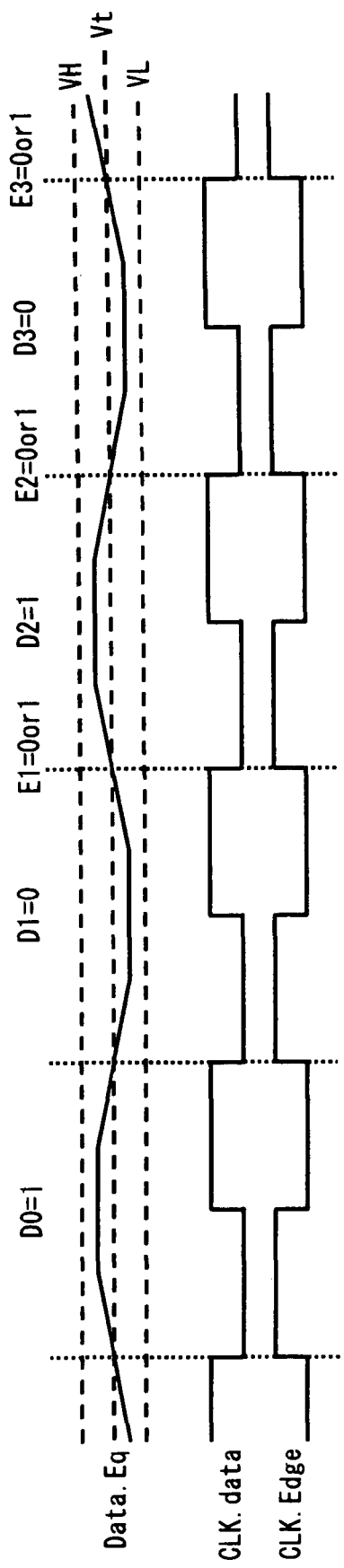
FIG. 9 is a timing chart showing an updating state of an intensity adjustment value in the receiver circuit according to the first exemplary embodiment of the present invention.

Next, FIG. 9 shows an example of waveforms in a case in which the reception intensity is low but no intensity judgment is performed. In the example shown in FIG. 9, the optimal upper-limit value of the correction input signal Data.Eq is denoted by VH, the optimal lower-limit value is denoted by VL, and the judgment threshold value of the High level and the Low level is denoted by Vt.

In the example shown in FIG. 9, the data D0 to D3 have the values of 1, 0, 1, 0, respectively. Thus, the first data Data0 is 1, the second data Data1 is 0, the third data Data2 is 1, and the fourth data Data3 is 0. Further, in the example shown in FIG. 9, the reception intensity is low, which makes both of the rising and falling of the correction input signal Data.Eq gradual and small amplitude. Hence, since boundary values E1 and E2 are each substantially a voltage in the midpoint of the ideal amplitude, the boundary value E1 between the second data Data1 and the third data Data2 is 0 or 1, and the boundary value E2 between the third data Data2 and the fourth data Data3 is 0 or 1. Thus, the first boundary data Edge1 is 0 or 1, and the second boundary data Edge2 is 0 or 1.

In the state as shown in FIG. 9, the output of the EXNOR circuit 70 of the intensity judgment circuit 51 is in the low level. Thus, the Strong flag and the Weak flag are set to the low level regardless of the values of the output signals of the EXOR circuits 71 to 74. Accordingly, the intensity judgment result filter circuit 52 and the intensity updating circuit 53 maintain the previous state.

In the state in which the input data repeatedly have the values of 0 and 1 as shown in FIGS. 8 and 9, the boundary value of the data items is not fixed to any one of 0 and 1. Thus, there is no false reading of data due to the strength of the reception intensity. In such a case, it is preferable that the intensity judgment is not executed so as to prevent the error of intensity adjustment.

From the above description, the receiver circuit 2 according to the first exemplary embodiment updates the intensity adjustment value when at least two or more data transmitted by the input signal Din continuously have the same value and thereafter only one data has a different value. In summary, the receiver circuit 2 need not perform the pattern matching between the pattern that is prepared in advance and the pattern of the reception data. Accordingly, the receiver circuit 2 is capable of updating the intensity adjustment value as needed, so as to set the optimal intensity adjustment value in a short time.

Further, when the intensity adjustment processing is executed based on the three data and the two boundary values between the three data, this may cause false adjustment of the reception intensity (e.g., Robert Payne et al.). More specifically, in the input signal having a pattern in which 0 and 1 are repeated (e.g., pattern as shown in FIGS. 8 and 9), for example, there is no isolated pulse and the pulse width is kept constant. In such a case, according to the method disclosed in Robert Payne et al., the intensity of the equalizer circuit may be falsely detected, which may cause false adjustment of the reception intensity. However, in the receiver circuit 2 according to the first exemplary embodiment of the present invention, the reception intensity is controlled according to the pattern of the data in which false judgment due to deviation of the reception intensity is obvious, thereby making it possible to prevent the reception intensity from being falsely adjusted. More specifically, the receiver circuit 2 updates the intensity adjustment value when the third data Data2 shows the different polarity from the second data Data1 and the fourth data Data3 in the state in which the first data Data0 and the second data Data1 have the same polarity.

Further, the receiver circuit 2 constitutes the equalizer control circuit 50 only with a digital circuit. Accordingly, the circuit area of the receiver circuit 2 can be deleted without using an element having large circuit area such as a capacitor. Furthermore, the receiver circuit 2 need not hold the pattern targeted for the updating of the intensity adjustment value in advance, and need not include a holding circuit or the like to hold the pattern, thereby achieving reduction in circuit size.

Further, the receiver circuit 2 includes the intensity judgment result filter circuit 52, thereby making it possible to prevent execution of the intensity adjustment due to false judgment even when the boundary value is in the metastable state, or there is caused fluctuations in the boundary value due to the fluctuations due to jitter.

Furthermore, the receiver circuit 2 does not consider the first data Data0 with substantially the same configuration as the intensity judgment circuit 51, thereby judging suitability of the sampling clock CLK.data and optimizing the phase of the sampling clock.

Second Exemplary Embodiment

Figure 10:
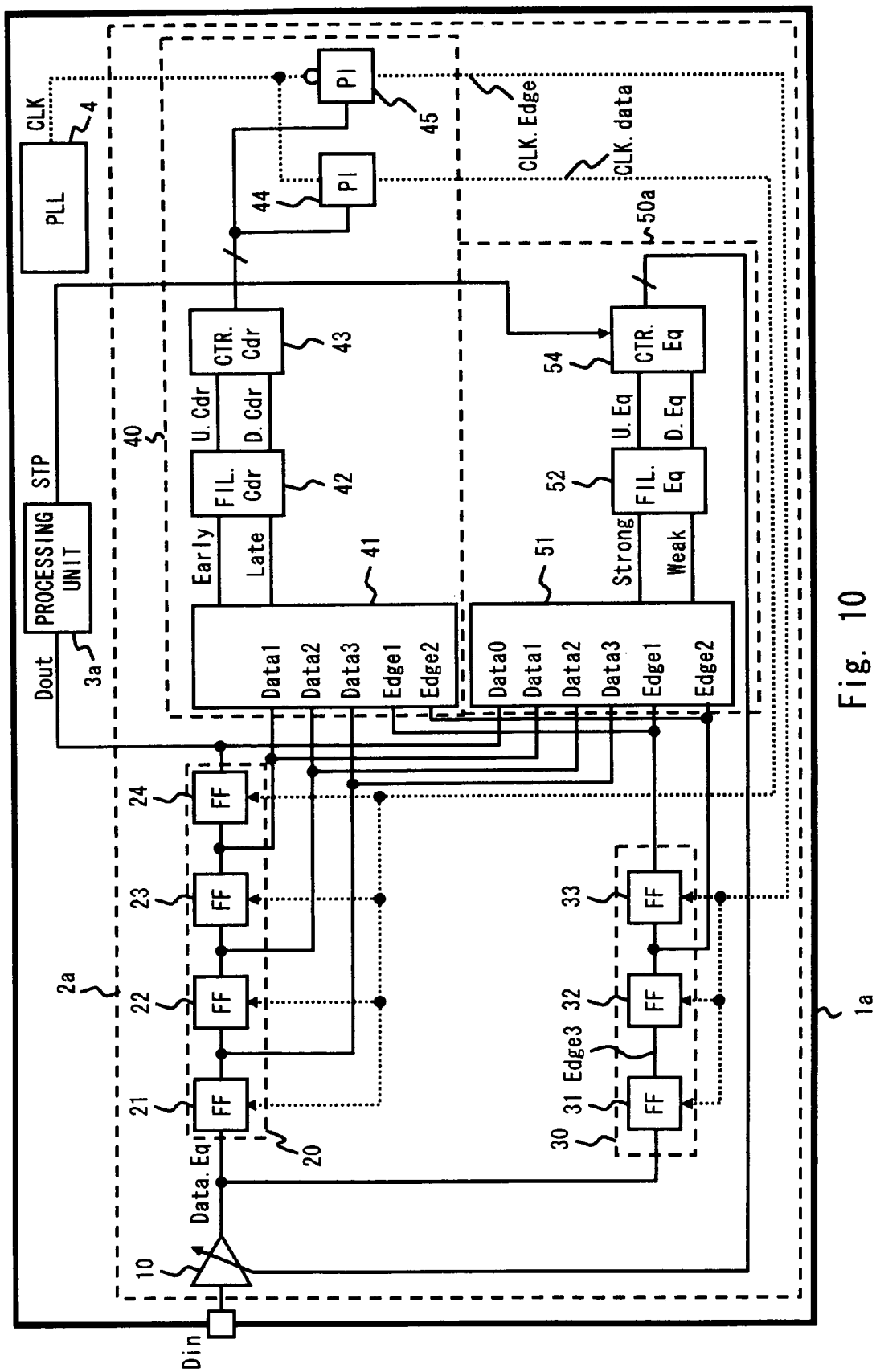
FIG. 10 is a block diagram of a semiconductor device according to a second exemplary embodiment of the present invention.
Figure 11:
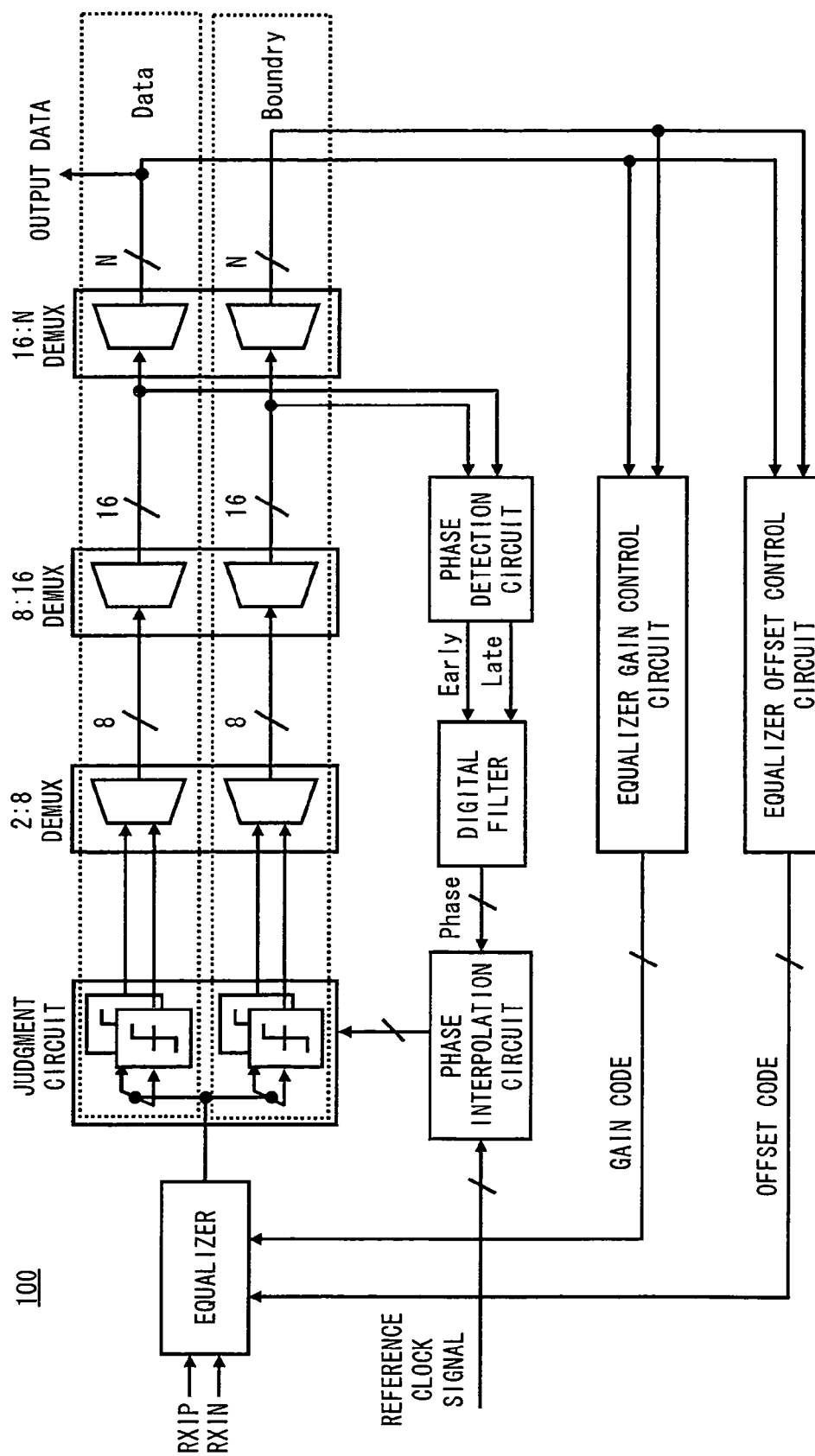
FIG. 11 is a block diagram of a receiver circuit disclosed in Yasuo Hidaka et al.
Figure 12:
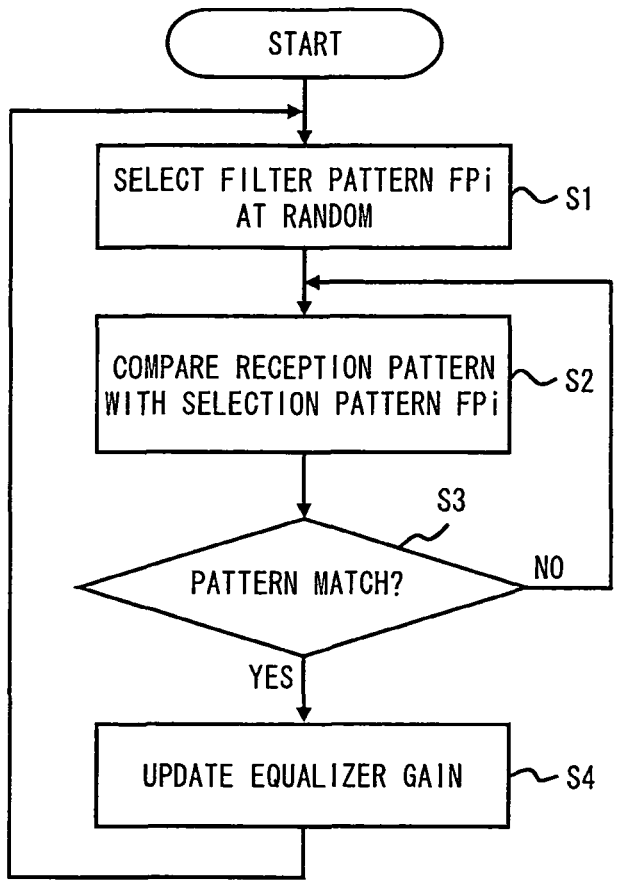
FIG. 12 is a flow chart showing an operation of an equalizer gain control circuit of the receiver circuit disclosed in Yasuo Hidaka et al.
Figure 14:
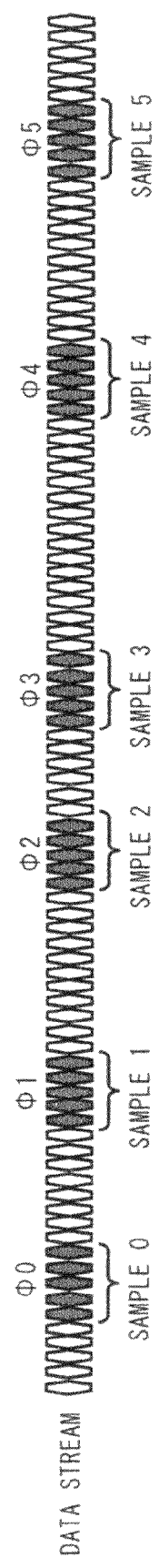
FIG. 14 is a timing chart showing an update timing of an equalizer gain in the receiver circuit disclosed in Yasuo Hidaka et al.

FIG. 10 shows a semiconductor device 1a according to a second exemplary embodiment. In FIG. 10, the identical components as those of FIG. 1 are denoted by the same reference symbols, and description thereof will be omitted.

As shown in FIG. 10, the semiconductor device 1a includes a receiver circuit 2a that corresponds to the receiver circuit 2. The receiver circuit 2a includes an equalizer control circuit 50a corresponding to the equalizer control circuit 50. The equalizer circuit 50a is different from the equalizer control circuit 50 in that it further includes an automatic adjustment stop function of the intensity adjustment value. The example shown in FIG. 10 shows a case in which a processing unit 3a outputs an adjustment stop signal STP and the equalizer control circuit 50a stops the automatic adjustment of the intensity adjustment value according to the adjustment stop signal STP. The adjustment stop signal STP may be output from other circuit than the processing unit 3a (for example, other semiconductor device than the semiconductor device 1a). Note that the processing unit 3a is different from the processing unit 3 in that it further includes a function of outputting the adjustment stop signal STP.

The equalizer control circuit 50a receives the adjustment stop signal STP. The adjustment stop signal STP includes an enable state to instruct stop of the automatic adjustment processing to the equalizer control circuit 50a, and a disenable state to instruct execution of the automatic adjustment processing to the equalizer control circuit 50a. When the updating before the adjustment stop signal STP is in the enable state is update processing that makes the intensity adjustment value larger (e.g., processing of increasing the intensity adjustment value by one), the equalizer control circuit 50a maintains the intensity adjustment value at a time point at which the adjustment stop signal STP in the enable state is input. Further, when the updating before the adjustment stop signal STP is in the enable state is update processing to make the intensity adjustment value smaller (e.g., processing of decreasing the intensity adjustment value by one), the equalizer control circuit 50a maintains the intensity adjustment value after update processing after the intensity adjustment value at a time at which the adjustment stop signal in the enable state is input is updated to a value greater by one stage (e.g., processing of increasing the intensity adjustment value by one).

In the example shown in FIG. 10, the adjustment stop signal STP is input to an intensity updating circuit 54 (that is obtained by adding an automatic adjustment processing stop function to the intensity updating circuit 53) that actually holds the intensity adjustment value, and the intensity updating circuit 54 executes the processing of the equalizer control circuit 50a. Thus, in the example shown in FIG. 10, the intensity updating circuit 54 preferably includes a memory element (e.g., flip-flop) that stores whether the previous update processing is executed based on the intensity reinforcement signal U.Eq (processing of increasing the intensity adjustment value by one) or the previous update processing is executed based on the intensity suppression signal D.Eq (processing of decreasing the intensity adjustment value by one).

As shown in FIG. 4, the intensity adjustment value converges to substantially a constant value after a predetermined automatic adjustment period. Hence, even when the automatic adjustment processing is stopped as in the equalizer control circuit 50a according to the second exemplary embodiment, the subsequent operation of the receiver circuit 2a is normally executed as long as the intensity adjustment value converges to a certain value. The semiconductor device 1a is able to reduce the power consumption required in the update processing of the intensity adjustment value by stopping the automatic adjustment processing.

The first and second exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above. For example, the configuration of the intensity judgment circuit 51 shown in FIG. 3 may be changed as appropriate to other circuit than those described above. Further, the scope of the claims is not limited by the exemplary embodiments described above.

Furthermore, it is noted that, Applicant's intent is to encompass equivalents of all claim elements, even if amended later during prosecution.

What is claimed is:

1. A receiver circuit comprising:
an equalizer circuit that adjusts reception intensity of an input signal based on an intensity adjustment value to generate a correction input signal;
a first holding unit that holds a plurality of data items sampled based on a sampling clock for sampling values of the data items transmitted by the correction input signal in a receiving order;

a second holding unit that holds a plurality of values of the correction input signal sampled based on a complementary sampling clock for sampling a boundary value of the data items in a receiving order; and an equalizer control circuit that judges the strength of reception intensity of the correction input signal based on a plurality of output signals of the first holding unit and a plurality of output signals of the second holding unit to update the intensity adjustment value based on the judgment result, wherein the equalizer control circuit judges the strength of the reception intensity based on the plurality of values held in the second holding unit when first data that is held at the earliest timing by the first holding unit and second data held subsequent to the first data have the same polarity.

2. The receiver circuit according to claim 1, wherein the first holding unit includes the first and the second data, and third and fourth data that are subsequent to the second data, and the second holding unit at least holds first boundary data corresponding to a boundary value of the second data and the third data, and second boundary data corresponding to a boundary value of the third data and the fourth data.

3. The receiver circuit according to claim 2, wherein, in a state in which the first data and the second data have the same polarity, the equalizer control circuit judges that the reception intensity is low to update the reception intensity value so as to make the reception intensity higher when the first boundary data and the second boundary data have different polarity from the third data, and judges that the reception intensity is high to update the reception intensity value so as to make the reception intensity lower when the first boundary data and the second boundary data have the same polarity to the third data.

4. The receiver circuit according to claim 1, wherein the equalizer control circuit comprises:

an intensity judgment result filter circuit that holds an accumulated value obtained by accumulating the judgment results of the reception intensity, and outputs an intensity reinforcement signal or an intensity suppression signal that instructs update of the reception intensity value according to the accumulated value reaching an upper-limit value or an lower-limit value; and an intensity updating circuit that updates the reception intensity value according to the intensity reinforcement signal or the intensity suppression signal, wherein the intensity judgment result filter circuit resets the accumulated value to an initial value according to the accumulated value reaching the predetermined value.

5. The receiver circuit according to claim 1, wherein the first holding unit and the second holding unit each constitute a shift register having a plurality of flip-flops connected in series, and each of output signals of the plurality of flip-flops is output to the equalizer control circuit.

6. The receiver circuit according to claim 1, wherein the equalizer control circuit receives an adjustment stop signal, when updating before the adjustment stop signal is in an enable state is update processing to make the intensity adjustment value larger, the equalizer control circuit maintains the intensity adjustment value at a time at which the adjustment stop signal in the enable state is input, and when updating before the adjustment stop signal is in the enable state is update processing to make the intensity adjustment value smaller, the equalizer control circuit maintains the intensity adjustment value after update processing after the intensity adjustment value at a time at which the adjustment stop signal in the enable state is input is updated to a value that is larger by one stage.

7. The receiver circuit according to claim 1, further comprising a clock phase control circuit that adjusts phases of the sampling clock and the complementary sampling clock based on a plurality of output signals of the first holding unit and a plurality of output signals of the second holding unit, wherein the clock phase control circuit delays phases of the sampling clock and the complementary sampling clock when the second data and the first boundary data are different from each other and the third data and the second boundary data are different from each other, and the clock phase control circuit advances phases of the sampling clock and the complementary sampling clock when the third data and the first boundary data are different from each other and the fourth data and the second boundary data are different from each other.

8. The receiver circuit according to claim 7, wherein the clock phase control circuit comprises:

a phase judgment result filter circuit that holds an accumulated value obtained by accumulating the judgment results of the phase, and outputs a phase delay instruction signal or a phase advance signal that specifies the phases of the sampling clock and the complementary sampling clock according to the accumulated value reaching a predetermined upper-limit value or lower-limit value; and a phase adjustment circuit that controls phases of the sampling clock and the complementary sampling clock according to the phase delay instruction signal or the phase advance instruction signal, wherein the phase judgment result filter circuit resets the accumulated value to an initial value according to the accumulated value reaching the predetermined value.

* * * * *